US012295281B2

(12) United States Patent
Boelter et al.

(10) Patent No.: US 12,295,281 B2
(45) Date of Patent: *May 13, 2025

(54) SYSTEM AND METHOD FOR CONTROLLING DISTRIBUTION PATTERN OF CENTRIFUGAL FERTILIZER SPREADERS

(71) Applicant: Highway Equipment Company, Cedar Rapids, IA (US)

(72) Inventors: Benjamin Dwayne Boelter, Cedar Rapids, IA (US); Nathan Andrew Marks, North Liberty, IA (US)

(73) Assignee: Highway Equipment Company, Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,865

(22) Filed: Jun. 5, 2023

(65) Prior Publication Data

US 2023/0301226 A1 Sep. 28, 2023

Related U.S. Application Data

(63) Continuation of application No. 17/570,773, filed on Jan. 7, 2022, now Pat. No. 11,665,994.

(60) Provisional application No. 63/135,280, filed on Jan. 8, 2021.

(51) Int. Cl.
*A01C 17/00* (2006.01)
*A01C 19/00* (2006.01)
*A01C 21/00* (2006.01)

(52) U.S. Cl.
CPC .......... *A01C 17/008* (2013.01); *A01C 17/001* (2013.01); *A01C 19/00* (2013.01); *A01C 21/005* (2013.01)

(58) Field of Classification Search
CPC ..... A01C 17/008; A01C 17/001; A01C 19/00; A01C 21/005; A01C 17/006; A01C 17/00; A01C 21/00
See application file for complete search history.

(56) References Cited

U.S. PATENT DOCUMENTS

| 3,075,777 | A | 1/1963 | Conibear |
| 3,174,758 | A | 3/1965 | Conibear |
| 4,367,848 | A | 1/1983 | Ehmke et al. |
| 4,779,765 | A | 10/1988 | Neumeyer |
| 6,517,281 | B1 | 2/2003 | Rissi |
| 6,817,551 | B2 | 11/2004 | Williams et al. |
| 7,654,476 | B2 | 2/2010 | Courtney et al. |
| 8,662,422 | B2 | 3/2014 | Ward et al. |

(Continued)

FOREIGN PATENT DOCUMENTS

| BR | PI1103408 A2 | 4/2014 |
| BR | 202012010932 U2 | 3/2015 |

(Continued)

OTHER PUBLICATIONS

PCT Application PCT/US2022/011610 Filed Jan. 7, 2022—International Search Report and Written Opinion dated Jun. 10, 2022.

*Primary Examiner* — Christopher J. Novosad
(74) *Attorney, Agent, or Firm* — Simmons Perrine Moyer Bergman PLC

(57) ABSTRACT

A spreader with a material divider that is adjustable to change a stream of material which flows in an arbitrary manner to the centrifugal disk(s) to achieve a desired symmetrical or asymmetrical spread pattern.

16 Claims, 15 Drawing Sheets

(56) References Cited

U.S. PATENT DOCUMENTS

| | | |
|---|---|---|
| 8,777,707 B2 | 7/2014 | Hoyle |
| 9,649,646 B1 | 5/2017 | Podoll et al. |
| 10,058,021 B2 | 8/2018 | Barsi et al. |
| 10,219,425 B2 | 3/2019 | Friggstad |
| 10,485,160 B2 | 11/2019 | Zimmerman et al. |
| 11,045,827 B2 | 6/2021 | Anderson et al. |
| 2004/0026544 A1 | 2/2004 | Williams et al. |
| 2017/0164551 A1 | 6/2017 | Posselius et al. |
| 2019/0047004 A1 | 2/2019 | Anderson et al. |
| 2020/0360950 A1 | 11/2020 | Anderson et al. |
| 2020/0384496 A1 | 12/2020 | Gray et al. |

FOREIGN PATENT DOCUMENTS

| | | |
|---|---|---|
| BR | PI1015607 A2 | 5/2015 |
| BR | 102014011586 A2 | 12/2015 |
| BR | 102015007554 A2 | 11/2016 |
| BR | 102016020210 A2 | 3/2017 |
| DK | 1542525 | 5/2006 |
| EP | 0170605 A1 | 2/1986 |
| EP | 3138375 A1 | 3/2017 |
| FR | 1419150 A | 11/1965 |
| FR | 3040255 B1 | 4/2018 |
| PL | 3138375 | 8/2019 |
| WO | 2016154697 A1 | 10/2016 |

# SYSTEM AND METHOD FOR CONTROLLING DISTRIBUTION PATTERN OF CENTRIFUGAL FERTILIZER SPREADERS

CROSS-REFERENCE TO RELATED APPLICATION

This application is a continuation of the non-provisional application on Jan. 7, 2022, and having Ser. No. 17/570,773, which application claims the benefit of the filing date of the provisional patent application filed by the same inventors on Jan. 8, 2021, and having Ser. No. 63/135,280, which application is incorporated herein by reference in their entirety.

BACKGROUND OF INVENTION

The invention relates to agricultural centrifugal spreaders.

Centrifugal spreaders are used to spread granular material such as fertilizer, sand, manure, lime, salt, etc. across a field, lawn, or road. Users of this equipment often try to spread the granular material as precisely as possible to save money and reduce over or under application, which can be detrimental to crop development.

A typical agricultural centrifugal spreader meters material from a bin through an orifice and onto rotary-driven centrifugal disks with throwing vanes (referred to herein as the spinner). The spinner typically has two centrifugal disks capable of uniform symmetrical distribution over a wide swath width. Often a main objective of these spreaders is to uniformly distribute material over an entire field. A typical approach for spreading a field is to spread the boundary then the remaining field is spread by a back-and-forth pattern. The driving centers of the back-and-forth pattern is often determined by the effective swath width of the spreader and the edge overlap at the outside edges of the distribution to produce an overall uniform distribution. Typically, the last pass of the back-and-forth pattern often requires a more precise asymmetrical swath to prevent unnecessary overlap.

To accomplish an asymmetrical swath, twin spinner gravity fed spreaders often close the orifice feeding material to the spinner on the side of the spreader needing a narrower width.

To accomplish an asymmetrical swath, twin spinner conveyor fed spreaders are often known to have:

- A material divider and spinner that move transversely beneath the flow of material in a direction opposite the side of the spreader needing a narrower width. See, U.S. Pat. No. 9,649,646B1.
- Dual feed gates that are variably adjustable independently from each other capable of varying or shutting off material flow to the spinner on the side of the spreader needing a narrower width. See European patent EP3138375B1.
- Dual conveyors and dual feed gates that are variably adjustable independently from each other capable of varying or shutting off material flow to the spinner on the side of the spreader needing a narrower width. See U.S. Pat. No. 8,777,707B2 and U.S. Ser. No. 11/045,827B2.

Systems as described above have provided certain advantages and have often worked acceptably in some respects but are not without disadvantages.

While the use of a material divider and spinner that move transversely beneath the flow of material can effectively produce an asymmetrical swath, the system itself can be complex and the components can be expensive.

Dual feed gate systems are also complex and the hydraulic valves, cylinders, sensors, etc. are expensive. In addition, having the metering orifice upstream creates the need to "look ahead" for the controls to anticipate changes in the swath width and there is the need to determine master and slave relationships between the conveyor and gates as metering is accomplished by both speed and opening. The timing lag often results in misapplication. There is also the concern that if one feed gate is closed, material can leak from under or around the sides of the feed gate resulting in misapplication and additional stress on the conveyor and supporting structures. If the spreader is operated too long with one feed gate closed, material could start to boil up and spill out of the hopper.

Dual feed gate and conveyor systems are often complex and doubling the number of conveyor systems, hydraulic motors, hydraulic valves, sensors, conveyors, bearings, drive shafts, etc. are expensive, add weight to the spreader, add volume to the drive components and take away usable volume for the spreader bins, hurt hydraulic efficiencies, etc. In addition, having the metering orifice upstream creates the need to "look ahead" for the controls to anticipate changes in the swath width and there is the need to determine master and slave relationships between the conveyors and gates as metering is accomplished by both speed and opening. The timing lag often results in misapplication.

What is needed in the art is a simple and cost-effective method to divide the flow of product being delivered to twin spinners from a shared conveyor to achieve an asymmetrical swath which minimizes misapplication and enhances operational efficiency and convenience of the applicator without complicating its construction.

The need for a simple method to do the above also needs to be accomplished with minimum compromise to the spread pattern coefficient of variation or restriction to the material flow.

SUMMARY OF THE INVENTION

The present invention provides a centrifugal spreader with a material divider which transfers particulate material from a storage container to the centrifugal disk(s) in an arbitrary manner to achieve a desired symmetrical or asymmetrical spread pattern.

The invention in one form thereof is directed to a centrifugal spreader including a storage container with a discharge end, a material divider mounted below said discharge end and positioned to receive material therein, said material divider includes an outlet orifice, a spinner mounted below said material divider and positioned to receive material therein, said spinner consisting of a rotary driven centrifugal disk positioned below said orifice, a means to convey material from said storage container to said material divider, with the improvement comprising a means for adjusting a stream of material which flows through said material divider in an arbitrary manner whereby achieving a desired symmetrical or asymmetrical spread pattern.

The invention in another form is directed to a centrifugal spreader including a storage container with a discharge end, a material divider mounted below said discharge end and positioned to receive material therein, said material divider includes an outlet orifice, a spinner mounted below said material divider and positioned to receive material therein, said spinner consisting of a rotary driven centrifugal disk positioned below said orifice, a means to convey material from said storage container to said material divider, with the improvement comprising a means for adjusting a stream of material which flows through said material divider in an arbitrary manner whereby achieving a desired symmetrical or asymmetrical spread pattern. The improvement means for adjusting said stream of material is driven by an actuating means (hydraulic cylinder, electric actuator, pneumatic cylinder, manual means, etc.).

An advantage is providing an improved particulate material spreader that achieves proper placement of product onto a field, lawn, or other area with relationship to the line of travel that can easily convert from normal symmetrical spreading to last pass asymmetrical spreading.

Another advantage is to change a stream of material being delivered to twin spinners in an arbitrary manner to the left-hand and/or right-hand centrifugal disk to achieve a desired symmetrical or asymmetrical spread pattern according to a prescription map and already-applied areas.

Another advantage is to change a stream of material being delivered to twin spinners from conveyors of multiple bin spreaders in an arbitrary manner to the left-hand and/or right-hand centrifugal disk to achieve a desired symmetrical or asymmetrical spread pattern according to a prescription map and already-applied areas.

Another objective of the present invention is to combine the benefits of adjusting a stream of material being delivered to twin spinners in an arbitrary manner to the left-hand and/or right-hand centrifugal disk with independent fore and aft movement of the spinner under the same divider to achieve proper placement of material onto a field, lawn, or other area.

Another objective of the present invention is to combine the benefits of adjusting a stream of material being delivered to twin spinners in an arbitrary manner to the left-hand and/or right-hand centrifugal disk with independent adjustment of the feed gate upstream of the discharge end to achieve the proper rate of material onto a field, lawn, or other area.

Still another advantage is providing a method that is adaptable to uses with different types of particulate products and on different types of agricultural implements.

The present invention comprises:

A centrifugal spreader comprising:
a container with a first end;
a material transporter to transport particulate material from said container to a material divider;
said material divider mounted below said first end, positioned to receive material therein and having a plurality of outlet orifices;
a spinner mounted below said material divider, and positioned to receive material therein;
said spinner having a plurality of centrifugal disks each with a throwing vane thereon; and
each of said plurality of centrifugal disks being positioned below one of said plurality of outlet orifices;
said material divider having a first internal moving part;
wherein said first internal moving part is configured to be moved by a moveable linkage;
said first internal moving part is moveably connected to a first actuator;
wherein said first internal moving part is configured to direct material to:
only a first disk of said plurality of centrifugal disks;
only a second disk of said plurality of centrifugal disks; or
both said first disk and said second disk.

DETAILED DESCRIPTION

Figure 1:
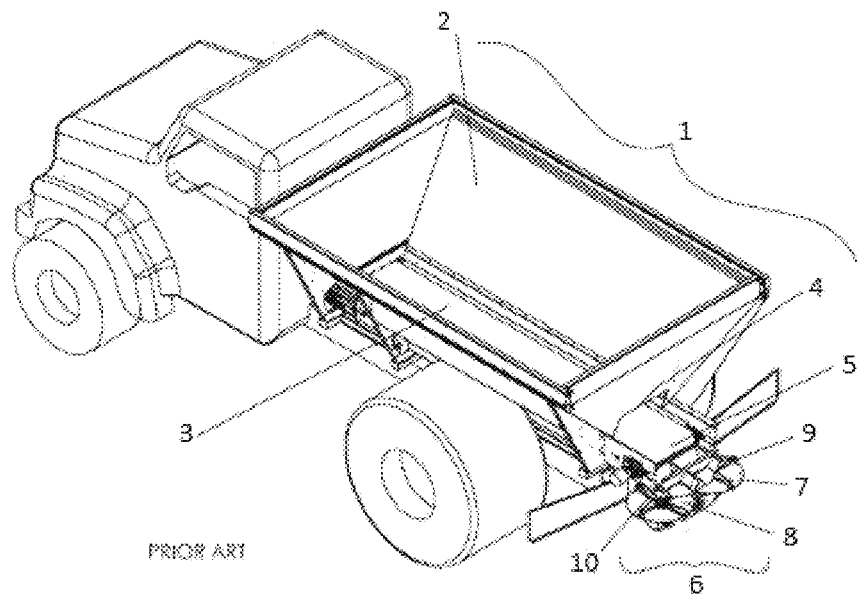
FIG. 1 is an overview of truck mounted spreader with material storage box, conveyor, divider, and spinner spreader, of the prior art.

Now referring to the drawings, wherein like numerals refer to like matter throughout and more particularly referring now to FIG. 1, which is a perspective view of a typical prior art truck mounted spreader 1 comprising a single v-body hopper 2, an endless conveyor 3 capable of transporting particulate material from the hopper 2 through an adjustable opening or feed gate 4 to the conveyor discharge end 5. Note: while an endless conveyor belt is shown, slat conveyors, chain conveyors, augers, or any suitable means of conveying the flowable matter could be used. Mounted under the conveyor discharge end 5 is a spinner spreader generally designated 6. The spinner spreader 6 comprises two rotatable centrifugal disks 7 and 8 with blades 9 that can accept metered material flowing from the conveyor discharge end 5 and distribute the particulate material onto a field, lawn, or road. Any number of centrifugal disks more than one, could be used in the present invention, two is merely an exemplary embodiment. (For example, more could be used if multiple conveyors were used extending along a respective lateral side of a longitudinal centerline axis of the chassis). Between the spinner spreader 6 and conveyor discharge end 5 is a material divider 10 that separates the material being discharged into columns of equal measure for placement onto the centrifugal disks 7 and 8, resulting in symmetrical spreading. Note: the material divider 10 can have an open end or can have a rear panel limiting the size of the flow. The material divider 10 may be adjustable fore and aft to direct placement onto the centrifugal disks 7 and 8 in a manner that affects when the particulate material leaves the disk blades 9 and therefore, the placement of the particulate material on the area being covered. As taught in Rissi U.S. Pat. No. 6,517,281, the material divider 10 may also be fixed and the spinner spreader 6 itself moveable fore and aft to further affect the precise placement of material on the area being covered.

Figure 2:
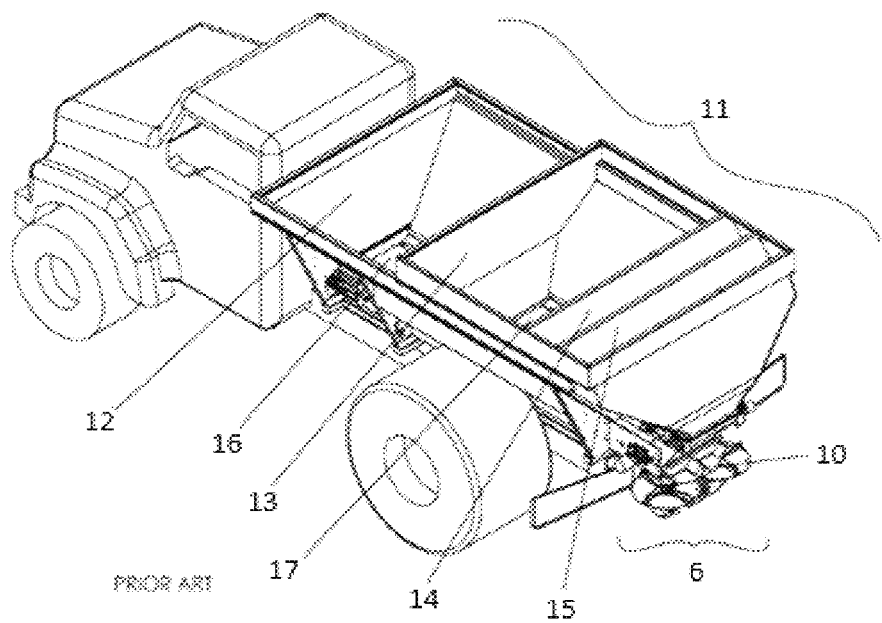
FIG. 2 is an overview of truck mounted spreader with multi-compartment storage box, a plurality of conveying means, divider, and spinner spreader, of the prior art.
Figure 3:
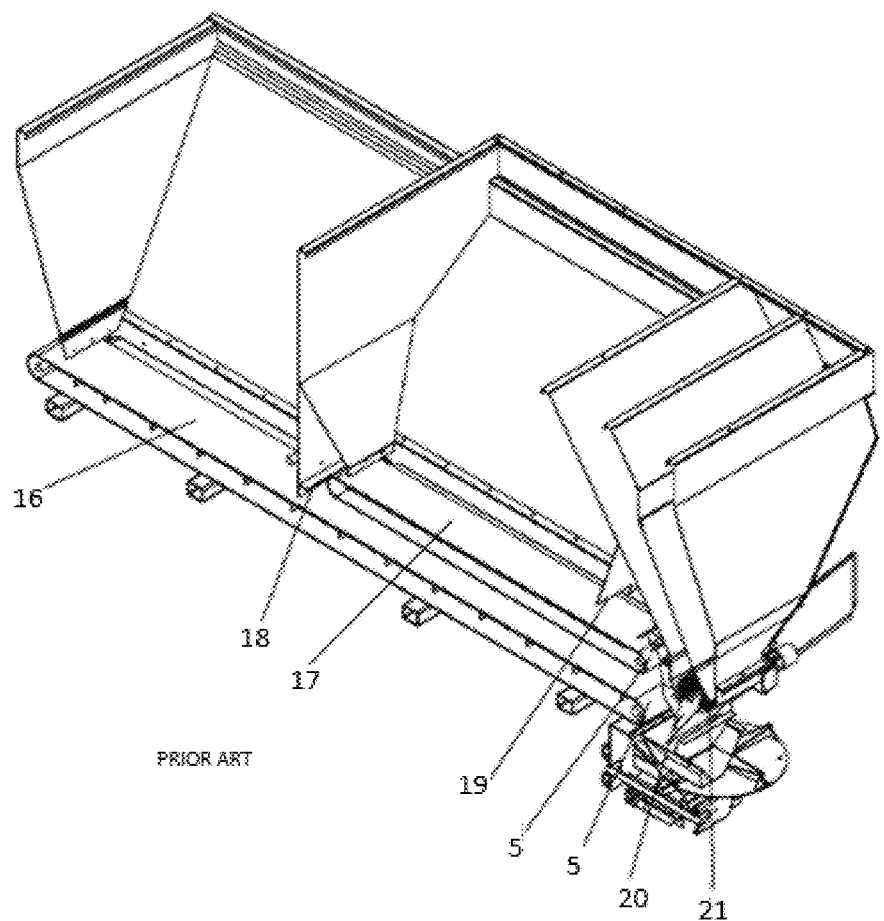
FIG. 3 is a sectioned view of FIG. 2 showing detail of conveyors, metering cylinders, and adjustable openings.

Now referring to FIG. 2 and FIG. 3, there is shown another perspective view of a typical prior art truck mounted multi-compartment spreader 11 comprising multiple material hoppers 12, 13, 14, and 15 with independent conveying means capable of transporting particulate material from each hopper to a discharge end. In the example shown, hopper 12 and hopper 13 utilize endless conveyors 16 and 17 and adjustable openings 18 and 19 similar to the example in FIG. 1 to transport and meter material to the conveyor discharge end 5. Hoppers 14 and 15 are mounted above, and gravity feed particulate material to, metering cylinders 20 and 21. These metering cylinders 20 and 21 and conveyor discharge ends 5 of the endless conveyors 16 and 17 all discharge material into the same vertical space where the materials fall nearly unrestricted by gravity on to a spinner spreader 6 as described earlier for the single hopper spreader 1. Therefore, any change in the endless conveyors 16 and 17 or meter cylinders 20 and 21 revolutions per time will immediately and independently affect the volume of material discharging from each hopper. Between the spinner spreader 6 and the conveyor discharge ends 5 and metering cylinders 20 and 21 is a material divider 10 that when in the symmetrical spreading position, separates the material being discharged into columns of equal measure for placement onto the centrifugal disks 7 and 8. When the material divider 10 is in the asymmetrical spreading position, it separates the material being discharged for placement onto at least one centrifugal disk 7 or 8 as described earlier for the single hopper spreader 1. Likewise, this divider 10 is typically either adjustable fore and aft or fixed as described for the single hopper spreader 1.

For simplicity, the remainder of the detailed description will use references for a typical truck mounted spreader 1 comprising a single v-body hopper 2. It shall remain understood that the present invention can be employed by spreaders with any number of material hoppers.

Figure 4:
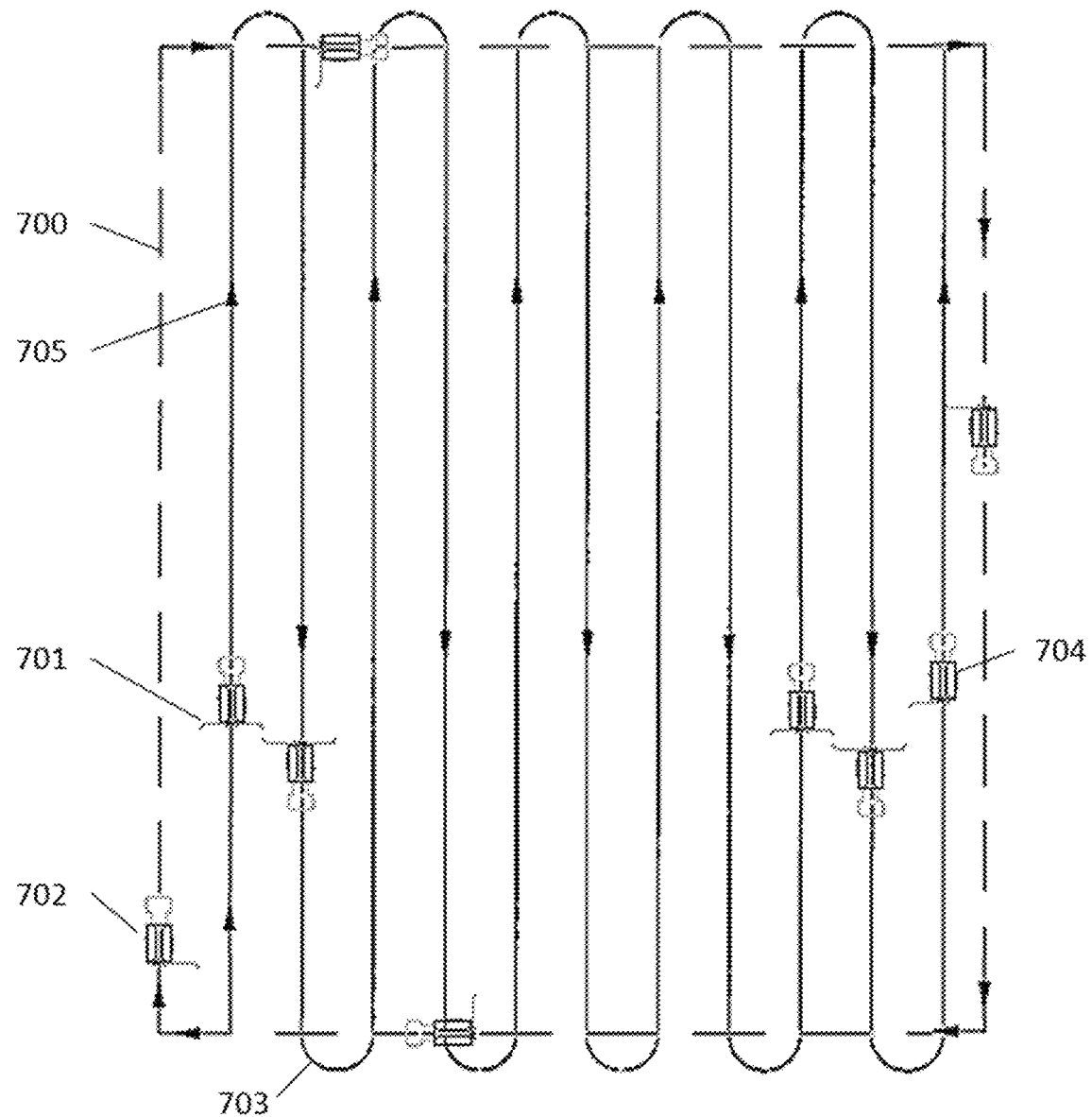
FIG. 4 is an example of a back-and-forth spreading approach.

Now referring to FIG. 4, there is shown a simplified representation of a back-and-forth pattern 703 approach for spreading a field. A typical approach for spreading a field is to spread the boundary 700 then the remaining field is spread by a back-and-forth pattern 703. The driving centers of the back-and-forth pattern 703 is determined by the effective swath width of the spreader and the edge overlap at the outside edges of the distribution to produce an overall uniform distribution. Typically, the last pass 704 of the back-and-forth pattern requires a more precise asymmetrical swath to prevent unnecessary overlap. Simple representations of border spreading 702, normal symmetrical spreading 701, direction of travel 705, and last pass spreading 704 are shown.

Figure 5:
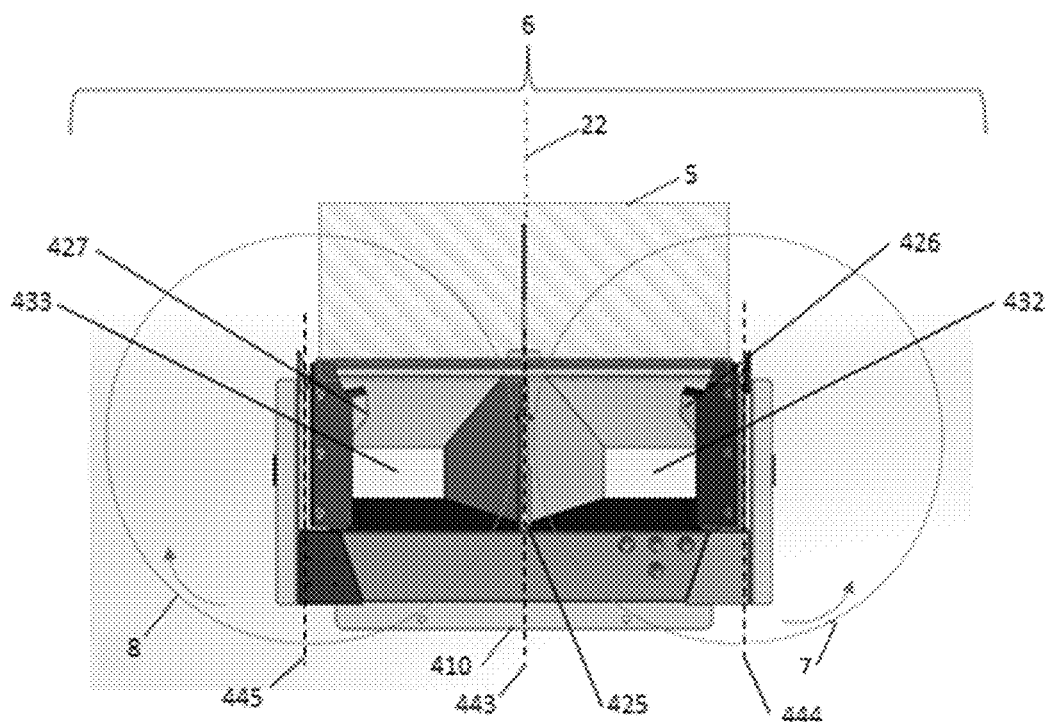
FIG. 5 is a simplified top view of a spinner, adjustable flow diverter supported by a material divider frame fixed in location with respect to the spinner, beneath the flow of material leaving a conveyor system adjusted to the setting for normal symmetrical spreading, splitting material flow equally onto left-hand centrifugal disk (8) and right-hand centrifugal disk (7).

Now referring to FIG. 5, there is shown a simplified bird's eye view of the present invention including a spinner spreader 6, with rotatable disks 7 and 8 (rotatable in direction shown) material divider 410 with a center material flow diverter 425 rotatable about hinge axis 443, a right-hand material flow diverter 426 rotatable about hinge axis 444 and a left-hand material flow diverter 427 rotatable about hinge axis 445 and supported by a material divider frame fixed in location with respect to the spinner 6, beneath the flow of material leaving the conveyor discharge end 5. Hinge axis 443, 444 and 445 are parallel to the conveyor centerline 22. The center material flow diverter 425, right-hand material flow diverter 426 and left-hand material flow diverter 427 are shown, in combination, in the normal symmetrical configuration with each flow diverter 425, 426, and 427 being adjusted to its own position setting for normal symmetrical spreading and each being oriented parallel to the conveyor centerline 22. The resulting geometry is similar to that of the prior art, splitting material flow equally onto left-hand centrifugal disk 8 and right-hand centrifugal disk 7 through left-hand material divider opening 433 and right-hand material divider opening 432. With volume and placement of the particulate material divided equally and for each centrifugal disk 7 and 8 turning at the same revolutions per minute, the resulting distribution onto the field, lawn, or roadway will be symmetrical from the conveyor centerline 22.

Figure 6:
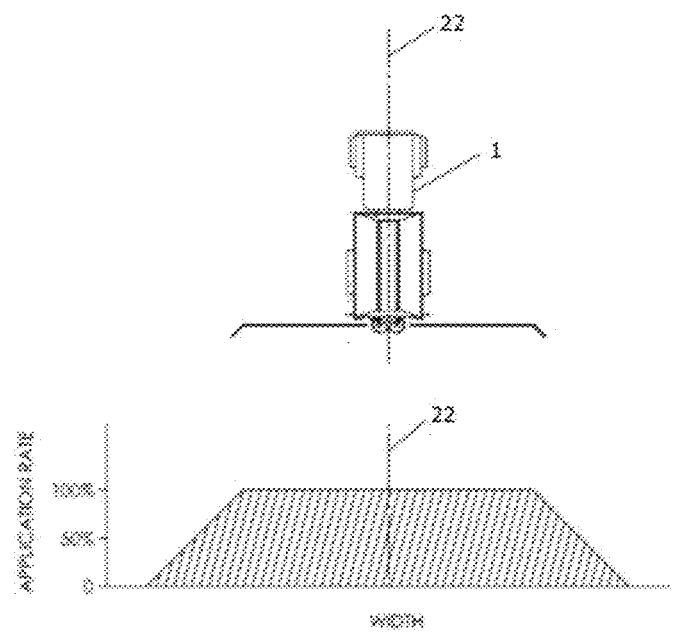
FIG. 6 is a spread pattern symmetry associated with the division of material in FIG. 5.

Now referring to FIG. 6, there is shown a simplified representation of the resulting spread pattern of a spinner apparatus with the relationship between conveyor discharge end 5, divider 410, and centrifugal disks 7 and 8 as shown in FIG. 5 if tested to a known standard such as ASABE S341.4.

Figure 7:
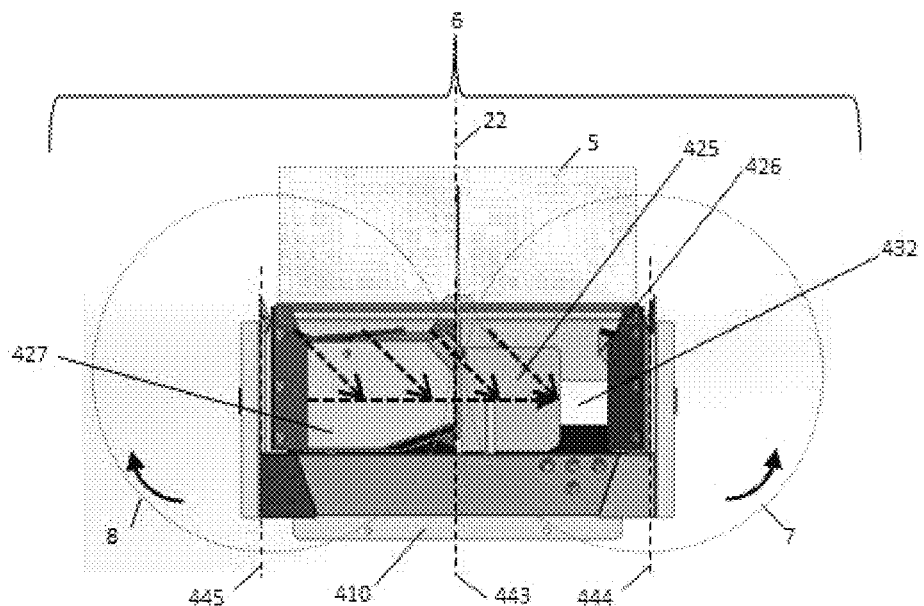
FIG. 7 is a simplified top view of a spinner, adjustable flow diverter supported by a material divider frame fixed in location with respect to the spinner, beneath the flow of material leaving a conveyor system adjusted to the setting for last pass spreading on the left-hand side of spreader, placing all material flow onto right-hand centrifugal disk (7) for asymmetrical spreading of the present invention.

FIG. 7 differs from the normal symmetrical spreading configuration according to FIG. 5 in that the center material flow diverter 425 and left-hand material flow diverter 427 are adjusted to the setting for left-hand last pass spreading. In this configuration, the orientation of the right-hand material flow diverter 426 does not move from its normal symmetrical spreading position shown in FIG. 5. The center material flow diverter 425, and left-hand material flow diverter 427 rotate approximately 45° toward right-hand material divider opening 432 about separate hinge axes, 443 and 445 respectively, to direct the flow of material leaving the conveyor discharge end 5 toward right-hand material divider opening 432. Left-hand material divider opening 433 is completely blocked by left-hand material flow diverter 427. Approximate direction of material flow once contact is made with center material flow diverter 425, and left-hand material flow diverter 427 is shown schematically by arrows. With a corresponding change to 50% of the original conveyor revolutions per minute, the volume of material passing through the right-hand material divider opening 432 and onto the right centrifugal disk 7 remains equal to that of the symmetrical pattern described and shown in FIG. 5 and FIG. 6. The resulting distribution onto the field, lawn, or roadway will be asymmetrical from the conveyor centerline 22 resulting in an ideal left-hand last pass pattern.

Figure 8:
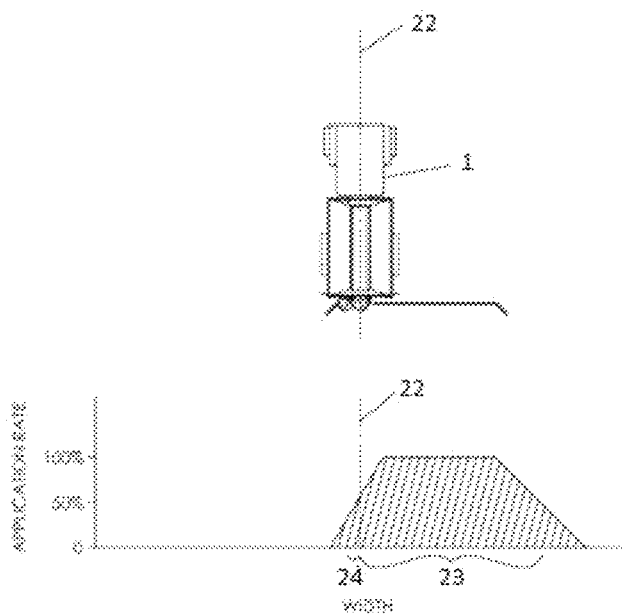
FIG. 8 is a spread pattern symmetry associated with the division of material in FIG. 7.

Now referring to FIG. 8, there is shown a simplified representation of the resulting spread pattern of a spinner apparatus with the relationship between conveyor discharge end 5, divider 410, and centrifugal disks 7 and 8 as shown in FIG. 7 if tested to a known standard such as ASABE S341.4.

Figure 9:
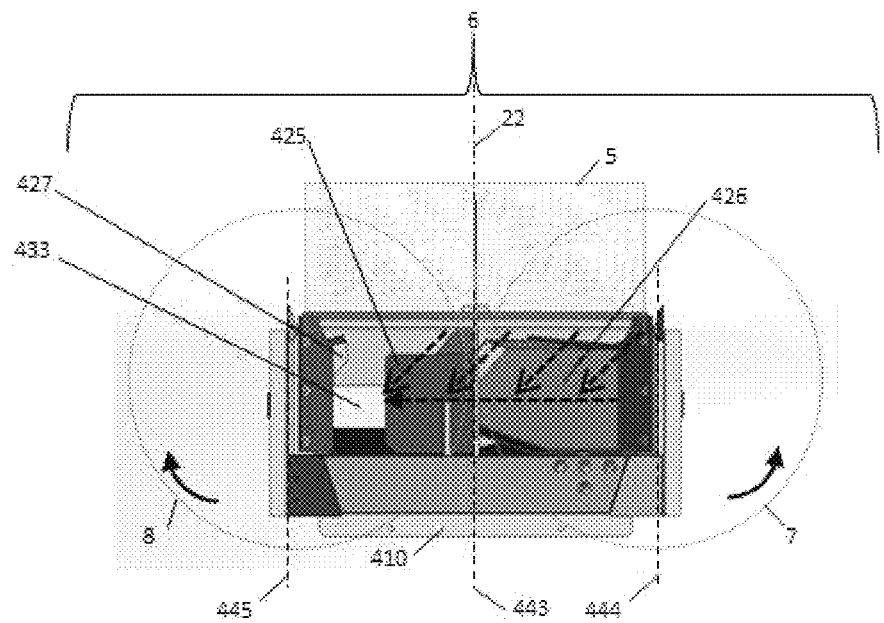
FIG. 9 is a simplified top view of a spinner, adjustable flow diverter supported by a material divider frame fixed in location with respect to the spinner, beneath the flow of material leaving a conveyor system adjusted to the setting for last pass spreading on the right-hand side of spreader, placing all material flow onto left-hand centrifugal disk (8) for asymmetrical spreading of the present invention.

FIG. 9 differs from the normal symmetrical configuration according to FIG. 5 in that the center material flow diverter 425 and right-hand material flow diverter 426 are adjusted to the setting for right-hand last pass spreading. In this configuration, the orientation of the left-hand material flow diverter 427 does not move from its normal symmetrical spreading position shown in FIG. 4. The center material flow diverter 425, and right-hand material flow diverter 426 rotate approximately 45° toward left-hand material divider opening 433 about separate hinge axes, 443 and 444 respectively, to direct the flow of material leaving the conveyor discharge end 5 toward left hand material divider opening 433. Right-hand material divider opening 432 is completely blocked by right-hand material flow diverter 426. Approximate direction of material flow once contact is made with center material flow diverter 425, and right-hand material flow diverter 426 is shown schematically by arrows. With a corresponding change to 50% of the original conveyor revolutions per minute, the volume of material passing through the left-hand material divider opening 433 and onto the left-hand centrifugal disk 8 remains equal to that of the normal symmetrical configuration/pattern described and shown in FIG. 5 and FIG. 6. The resulting distribution onto the field, lawn, or roadway will be asymmetrical from the conveyor centerline 22 resulting in an ideal right-hand last pass pattern.

Figure 10:
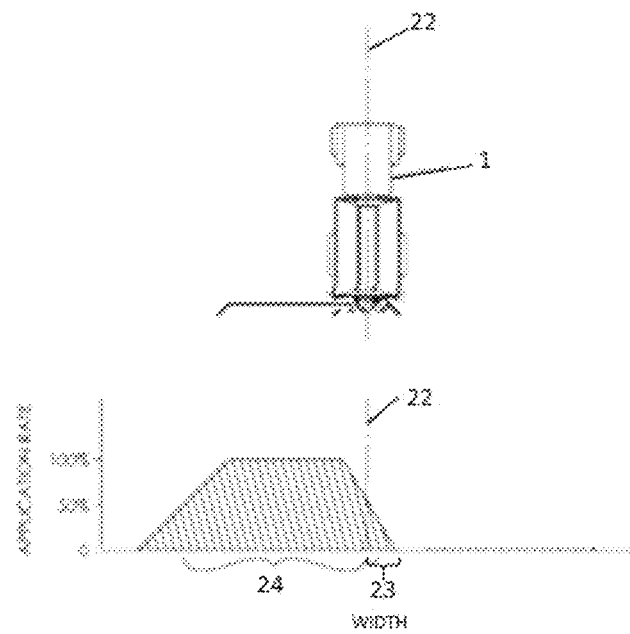
FIG. 10 is a spread pattern symmetry associated with the division of material in FIG. 9.

Now referring to FIG. 10, there is shown a simplified representation of the resulting spread pattern of a spinner apparatus with the relationship between conveyor discharge end 5, divider 410, and centrifugal disks 7 and 8 as shown in FIG. 8 if tested to a known standard such as ASABE S341.4.

Figure 11:
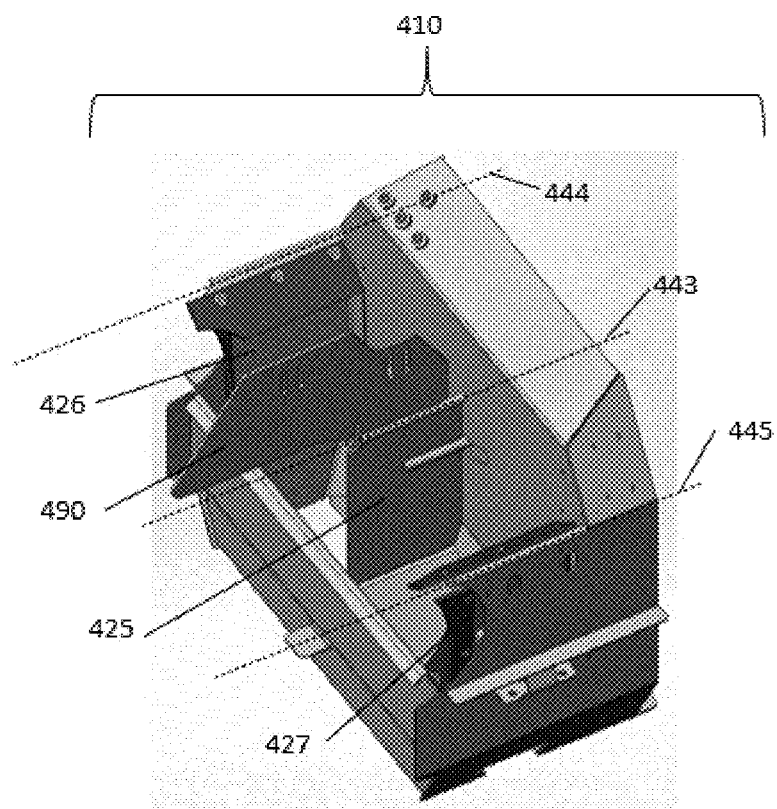
FIG. 11 is a perspective view of front side of present invention adjusted to the setting for normal symmetrical spreading noting structures that are adjustable and fixed.

FIG. 11 is a perspective view of front side of material divider 410, of the present invention, shown adjusted to the normal symmetrical configuration. The adjustable center material flow diverter 425 is hinged on axis 443 and supported on the front side to a fixed material flow diverter 490 located above it and on the backside to the fixed material divider frame. The left-hand and right-hand adjustable material flow diverter 427 and 426, respectively, are hinged on axes 445 and 444, respectively, and supported by the fixed material divider frame.

Figure 12:
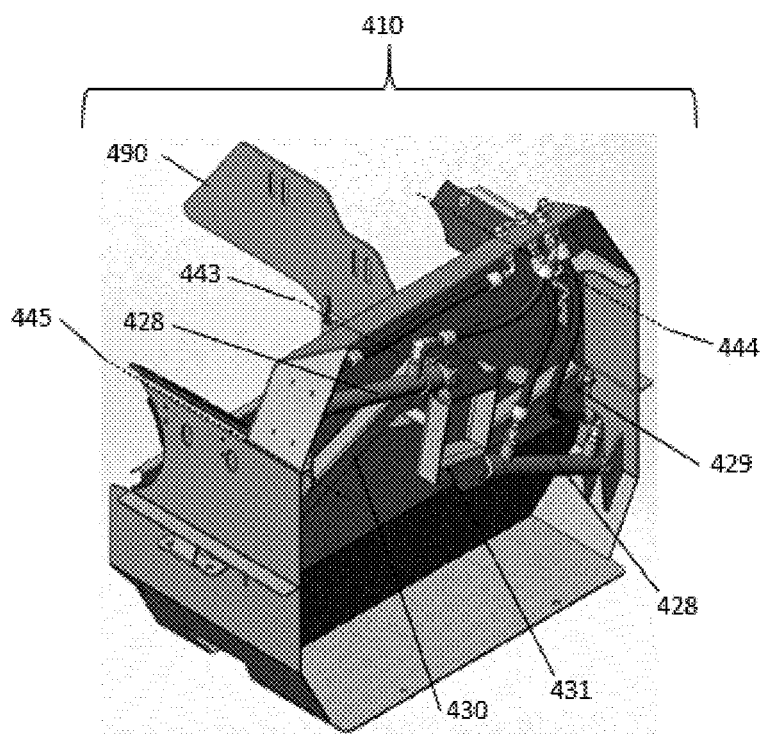
FIG. 12 is a perspective view of backside of present invention adjusted to the setting for normal symmetrical spreading with details of supporting and actuating means as well as noting structures that are adjustable and fixed.
Figure 13:
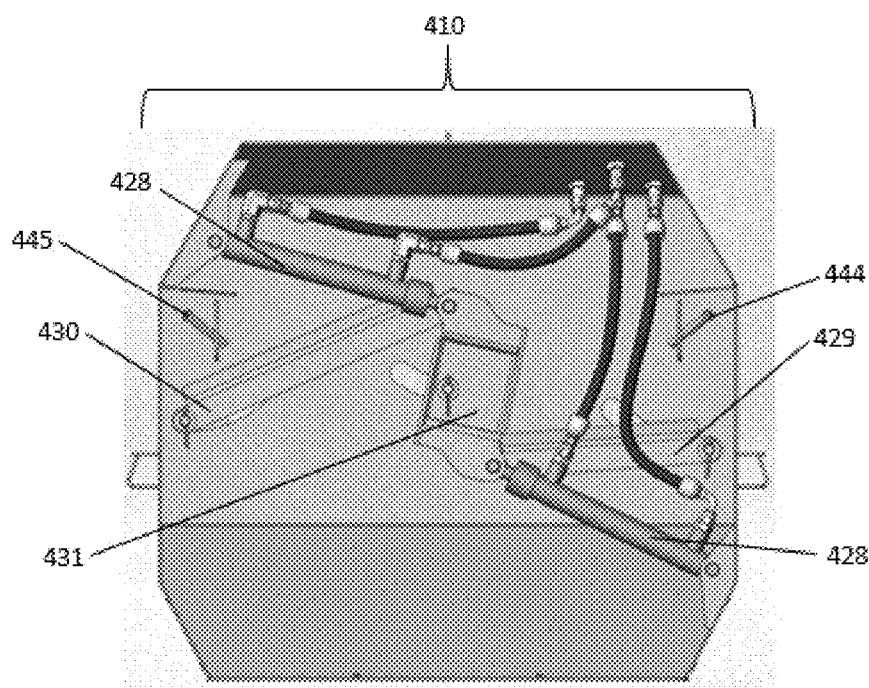
FIG. 13 is a rear view of present invention adjusted to the setting for normal symmetrical spreading with details of supporting and actuating means as well as noting structures that are adjustable and fixed.
Figure 14:
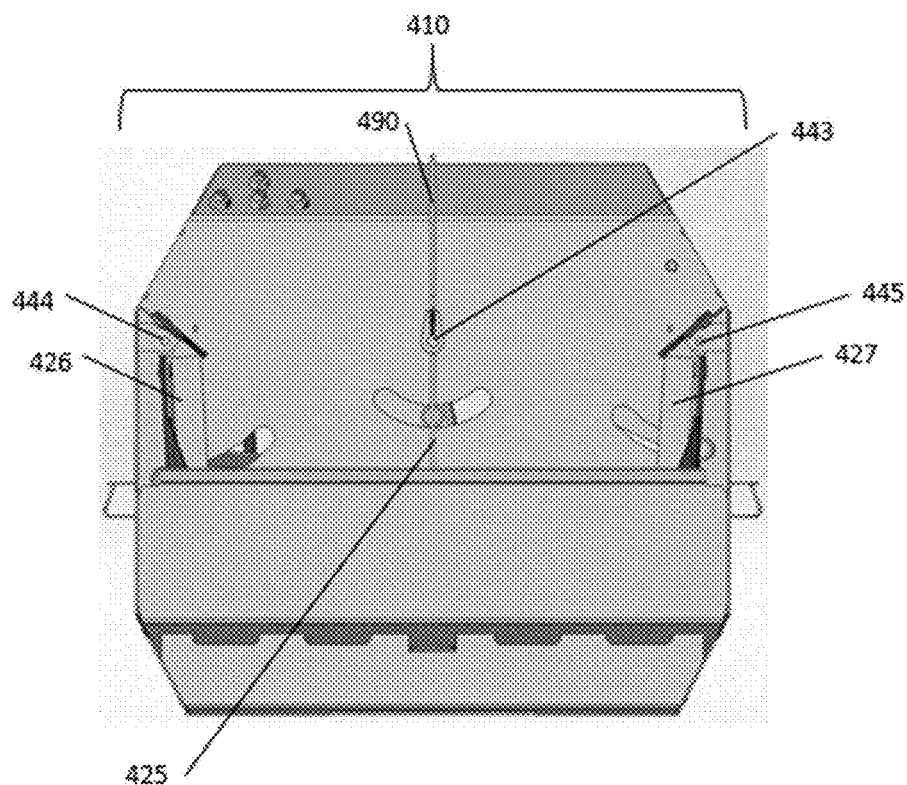
FIG. 14 is a front view of present invention adjusted to the setting for normal symmetrical spreading with details of supporting and actuating means as well as noting structures that are adjustable and fixed.

FIGS. 12, 13 and 14 are a backside perspective view, a rear view and front view, respectively, of material divider 410, of the present invention, shown adjusted to the normal symmetrical configuration with details of supporting actuating means. The adjustable center material flow diverter 425, left-hand adjustable material flow diverter 427 and right-hand adjustable material flow diverter 426 are linked together on the backside by a right-hand moveable linkage 429, a left-hand moveable linkage 430, and a center movable linkage 431. Linear actuators 428 that are sufficient in size are mounted on one end to the fixed material divider frame and on the other end are linked to the right-hand moveable linkage 429, a left-hand moveable linkage 430, and a center movable linkage 431. Both linear actuators 428 are retracted for normal symmetrical spreading.

Figure 15:
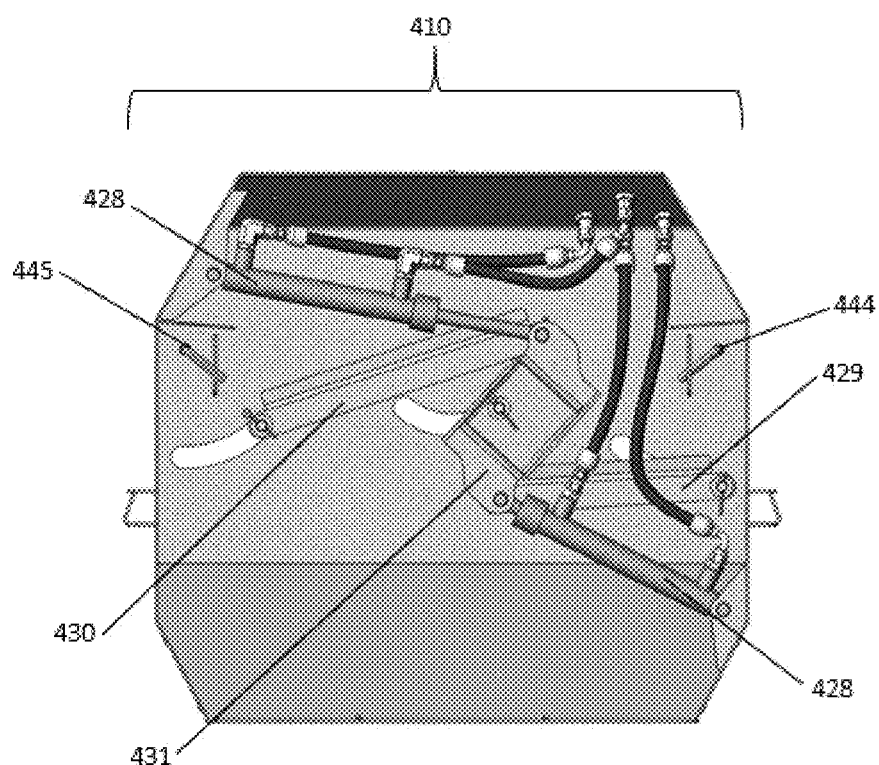
FIG. 15 is a rear view of present invention adjusted to the setting for last pass spreading on the left-hand side of spreader with details of supporting and actuating means as well as noting structures that are adjustable and fixed.
Figure 16:
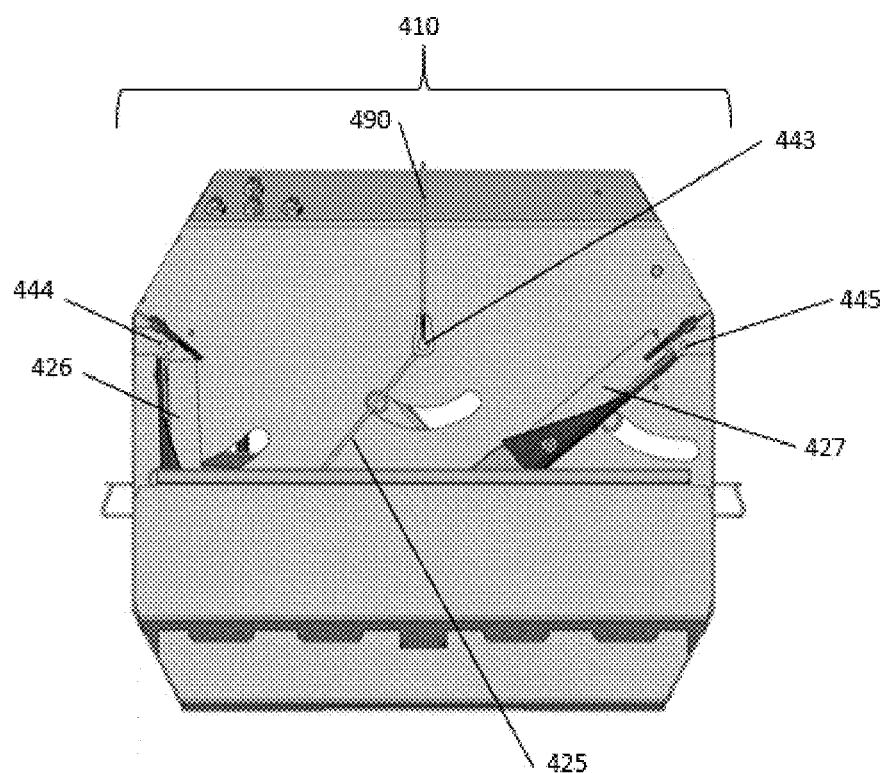
FIG. 16 is a front view of present invention adjusted to the setting for last pass spreading on the left-hand side of spreader with details of supporting and actuating means as well as noting structures that are adjustable and fixed.

FIGS. 15 and 16 differ from the normal symmetrical configuration according to FIGS. 13 and 14 in that the center material flow diverter 425 and left-hand material flow diverter 427 are adjusted to the setting for left-hand last pass spreading. When left-hand last pass spreading setting is activated, the top linear actuator 428 is extended, pushing the center linkage 431 and left-hand linkage 430 along a slot path resulting in the center material flow diverter 425, and left-hand material flow diverter 427 to rotate approximately 45° toward right-hand material divider opening 432 about separate hinge axes, 443 and 445 respectively, to direct the flow of material leaving the conveyor discharge end 5 toward right-hand material divider opening 432. In this configuration, the lower linear actuator 428 and the orientation of the right-hand material flow diverter 426 and right-hand moveable linkage 429, do not move from their normal symmetrical spreading position.

Figure 17:
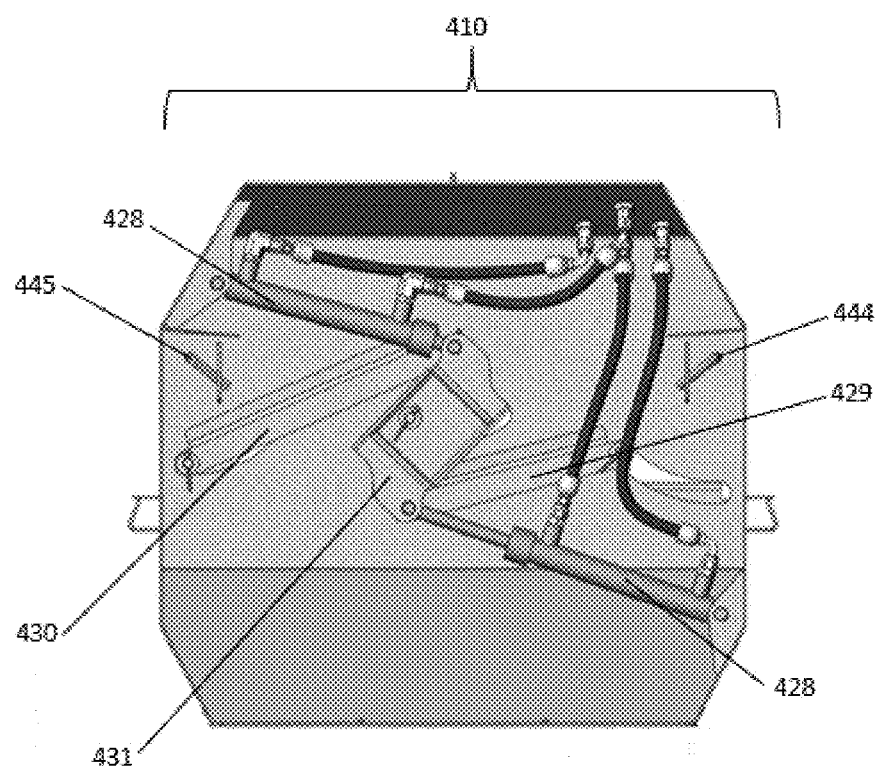
FIG. 17 is a rear view of present invention adjusted to the setting for last pass spreading on the right-hand side of spreader with details of supporting and actuating means as well as noting structures that are adjustable and fixed.
Figure 18:
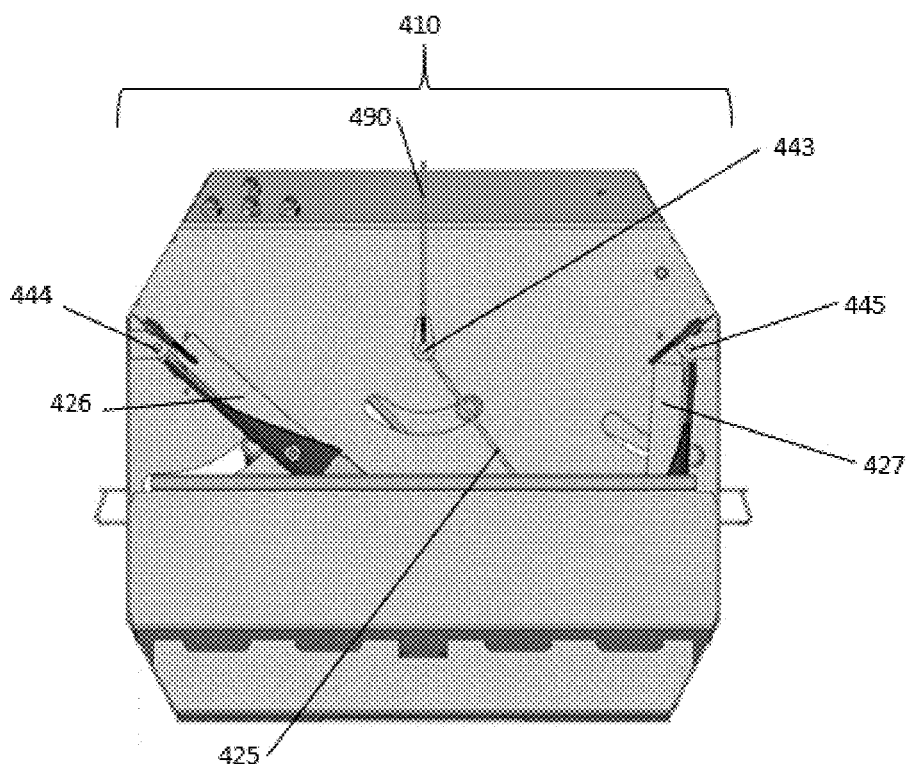
FIG. 18 is a front view of present invention adjusted to the setting for last pass spreading on the right-hand side of spreader with details of supporting and actuating means as well as noting structures that are adjustable and fixed.

FIGS. 17 and 18 differ from the normal symmetrical configuration according to FIGS. 13 and 14 in that the center material flow diverter 425 and right-hand material flow diverter 426 are adjusted to the setting for right-hand last pass spreading. When right-hand last pass spreading setting is activated the bottom linear actuator 428 is extended, pushing the center linkage 431 and right-hand linkage 429 along a slot path resulting in the center material flow diverter 425, and right-hand material flow diverter 426 to rotate approximately 45° toward left-hand material divider opening 433 about separate hinge axes, 443 and 444 respectively, to direct the flow of material leaving the conveyor discharge end 5 toward left-hand material divider opening 433. In this configuration, the top linear actuator 428 and the orientation of the left-hand material flow diverter 427 and left-hand moveable linkage 430, do not move from their normal symmetrical spreading position.

Figure 19:
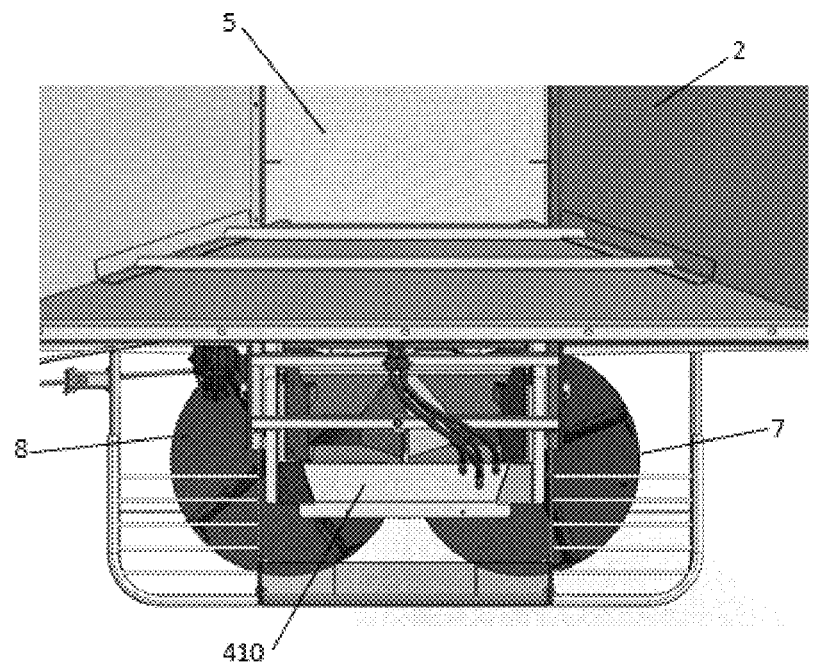
FIG. 19 is a top view of the present invention adjusted to the setting for normal symmetrical spreading installed on a single v-body spinner spreader with an endless conveyor.

FIG. 19 differs from the configuration according to FIG. 1 in that the material divider 410, of the present invention adjusted to the normal symmetrical configuration, is shown installed on a single v-body 2 spinner spreader with endless conveyor 5.

Figure 20:
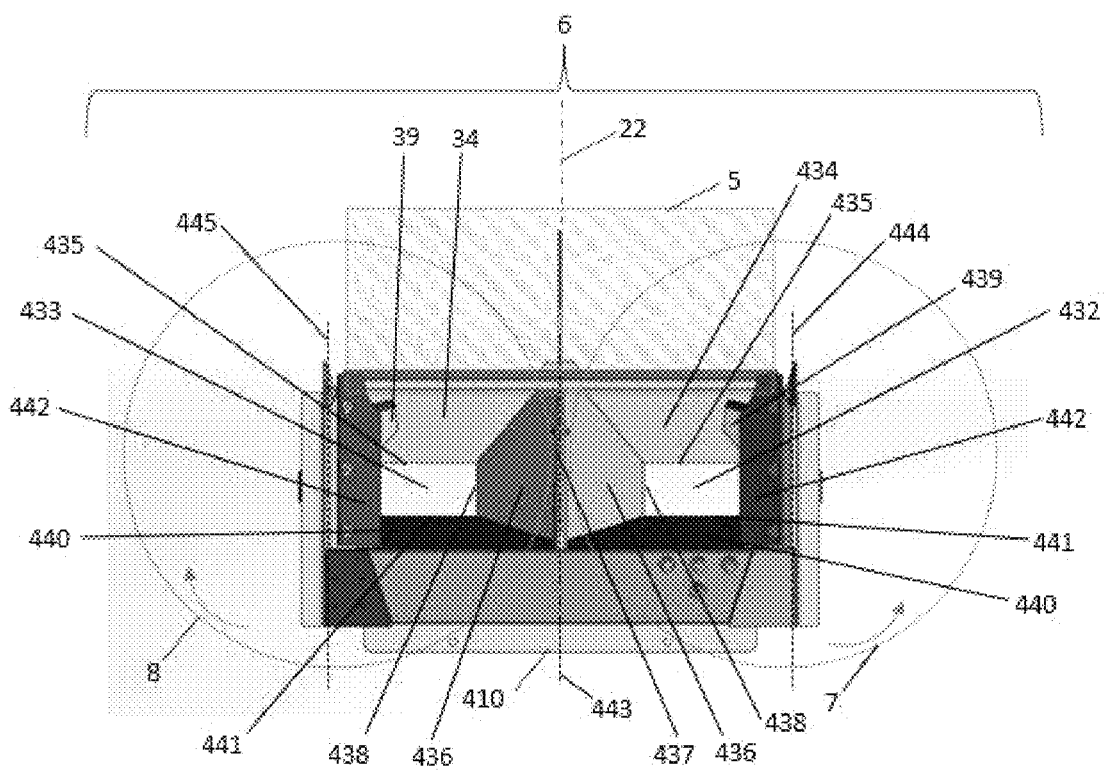
FIG. 20 is a simplified top view of spinner with details of the present invention adjusted to the setting for normal symmetrical spreading.

FIG. 20 is an overhead view of material divider 410, of the present invention adjusted to the normal symmetrical configuration with details of other features related to aiding position and directing the flow of material falling from the conveyor discharge end. One should note that the material divider 410 funnels material to the centrifugal disks 7 and 8 below, through the right-hand material divider opening 432, left-hand material divider opening 433 or both. The divider openings are defined by four walls. The first wall 434 is a forward sloped surface that funnels material and defines the leading drop edge 435. The second wall 436 is an inside sloped surface that rises to meet the inside surface of the adjacent divider opening and defines both the dividing edge 437 of the material stream and the outer drop edge 438 with respect to the centrifugal disks 7 and 8. The third wall 439 is the outside surface that extends upward and away from the spinner centerline 22. This outside surface 439 extends well beyond the outer edges of the conveyor 5, and any metering cylinders of a multi-compartment spreader. The fourth wall 440 keeps the column of falling material from deviating more than a set distance from the leading drop edge 435 of the forward sloped surface 434 and defines the trailing drop edge 441.

Across the upper edge of the first wall that is the forward sloped surface 34 is a pliable material that forms a seal 442 between the bottom of the discharge conveyor end 5 and the top of the material divider 410 to further keep falling material within the defined area of the four walls.

In this configuration, the drop edge 435 of the forward sloped surface 434 is straight and perpendicular to the conveyor centerline 22. It should also be understood that the shape of this drop edge 435 and the angle to the conveyor centerline 22 can be modified to further shape the distribution and pattern of the broadcast material. Likewise, the distance between the centrifugal disks 7 and 8, and the width of the inverted V formed by the second wall that is the inside sloped surface 436 of the material divider 410 can be modified to further shape the distribution and pattern of the broadcast material.

Figure 21:
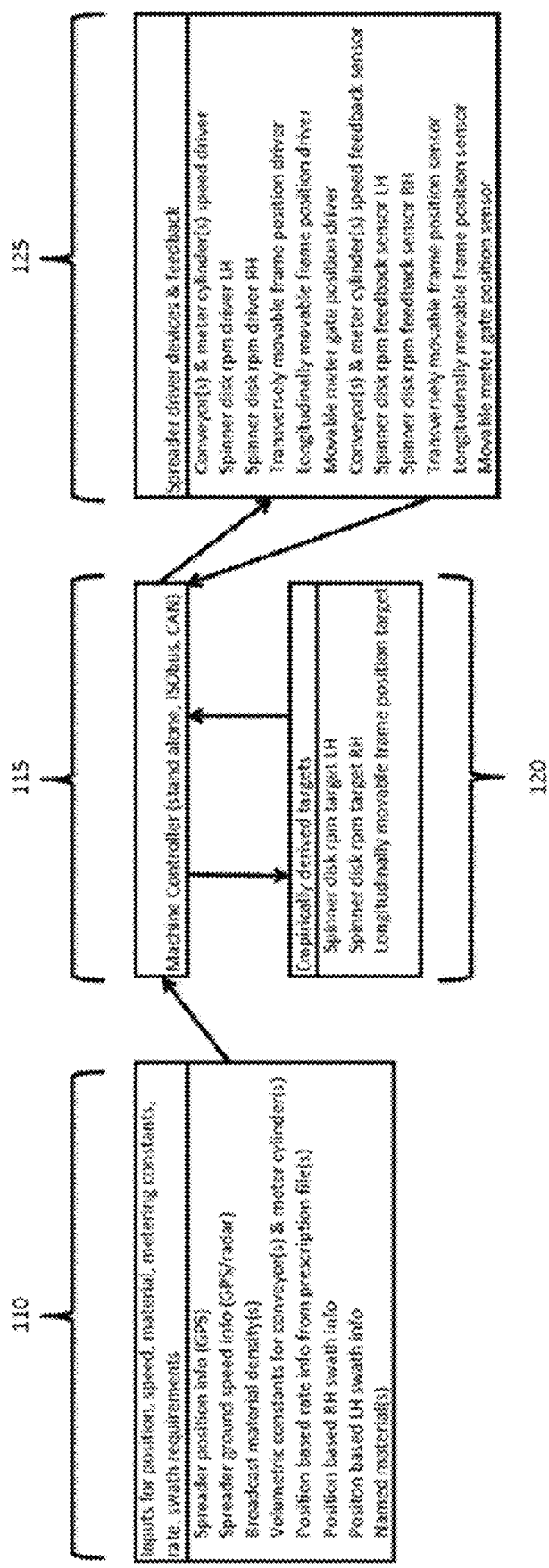
FIG. 21 is a diagrammatic overview of a control system of the prior art.
Figure 22:
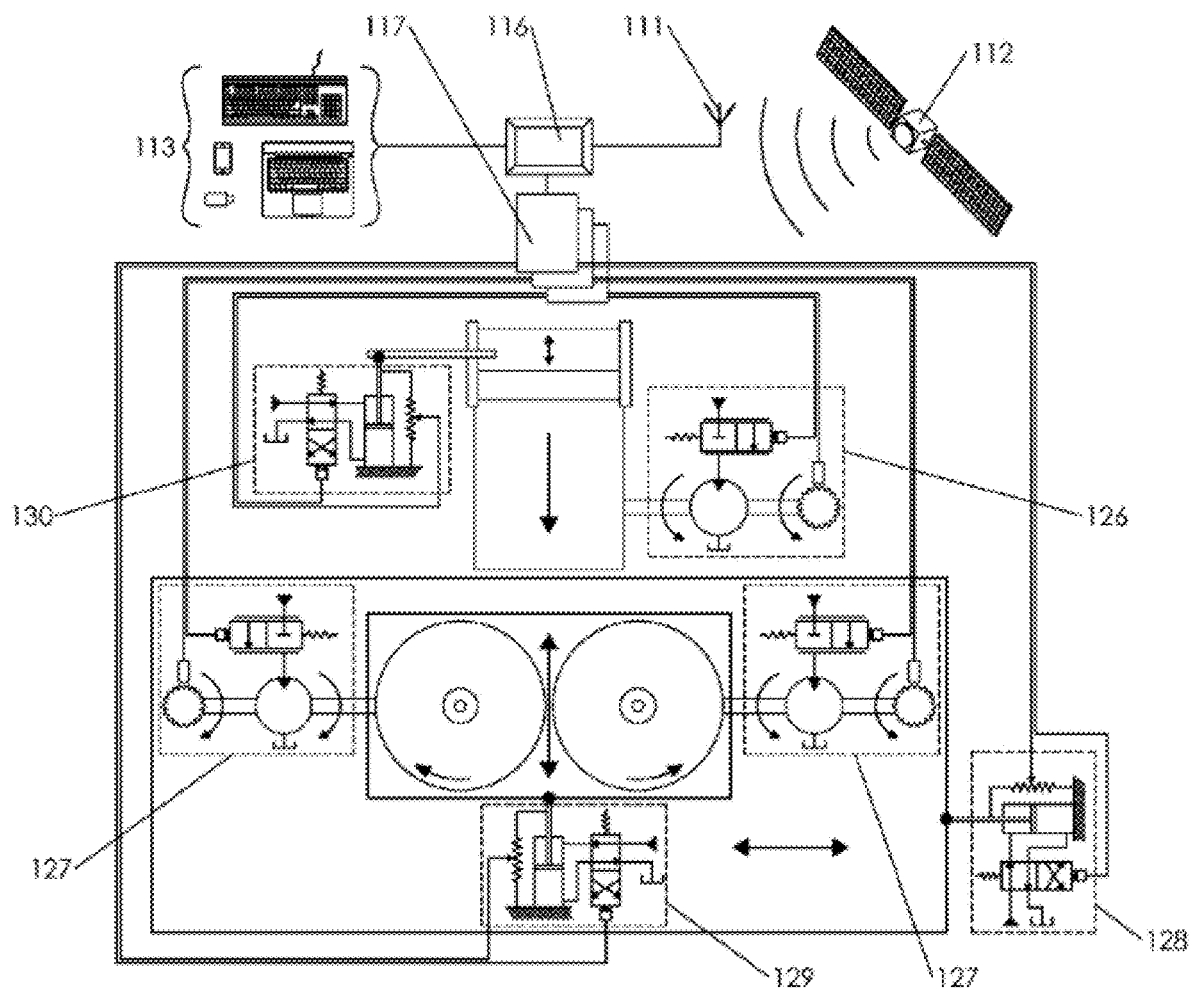
FIG. 22 is a depiction of a system of the prior art in its intended environment.

Now referring to FIGS. 21 and 22, there is shown simplified diagrammatic overviews of control system elements of the prior art. The control system elements for the present invention is an advancement from U.S. Pat. No. 9,649,646. The prior patent is incorporated herein by reference in its entirety.

The machine controller element generally designated 115 comprising electronics, software, and user interfaces. The machine controller element 115 can take many different physical forms from a single, stand-alone box including all electronics, software, and a user interface, to a user interface 116 and a plurality of boxes 117 at different locations and with different functions. A machine controller element 115 with a plurality of boxes 117 and a user interface 116 are typically connected via ISO Bus or CAN Bus networks. This machine controller element 115 processes information and initiates machine actions based on external input elements generally designated 110, empirically derived target elements generally designated 120, and feedback from spreader device elements generally designated 125.

The external input elements 110 comprises inputs that define spreader position and speed through a Global Positioning System (GPS) pictorially shown as a GPS satellite 112 and a GPS receiver 111. In combination with speed and position information, the external input elements 110 also include variable symmetrical or asymmetrical swath width definitions, variable rate nutrient prescription files, nutrient material densities, and conveyor metering volumetric constants inputs that are used by the machine controller element 115 to meter the correct volume of material for variable rates and swath widths. Material ID or named material inputs are used for association with, and editing of, the empirically derived target elements 120 as it is understood from previous descriptions materials have unique size, shape, density, and hardness that affect spread characteristics. These external input elements 110 may be entered into the machine controller element 115 via the user interface 116 or any number of devices, wireless or wired to the controller element, such as laptop computers, keyboards, phones, flash drives, memory cards, etc. that are generally shown 113.

Empirically derived target elements 120 include information needed to control symmetrical or asymmetrical variable swath widths for named materials broadcast at variable rates. The type of information contained in the empirically derived target elements 120 includes the spinner disk rpm for desired widths of a named material as well as movable frame positions needed for desired broadcast pattern symmetry. Empirically derived elements 120 are determined by field tests common to prior art spreaders.

The spreader device elements 125 include drivers and feedback for conveyor speed 126, independent spinner rpm 127, transversely movable frame position 128, longitudinally moveable frame position 129, and movable metering gate 130 per the needs of the external driver elements 110 and empirically derived target elements 120.

Figure 23:
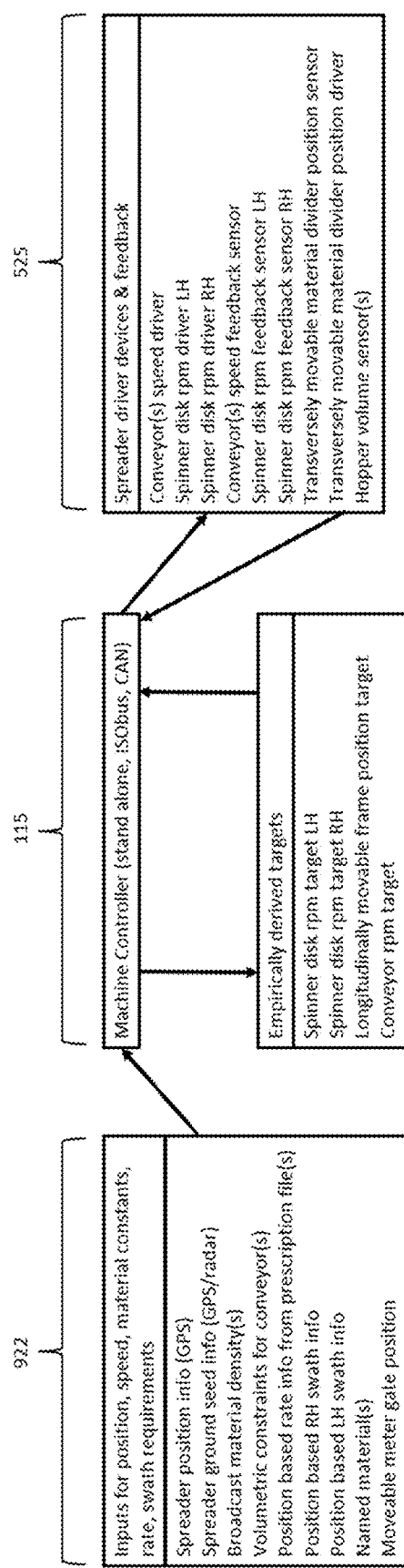
FIG. 23 is a diagrammatic overview of a control system for the present invention.
Figure 24:
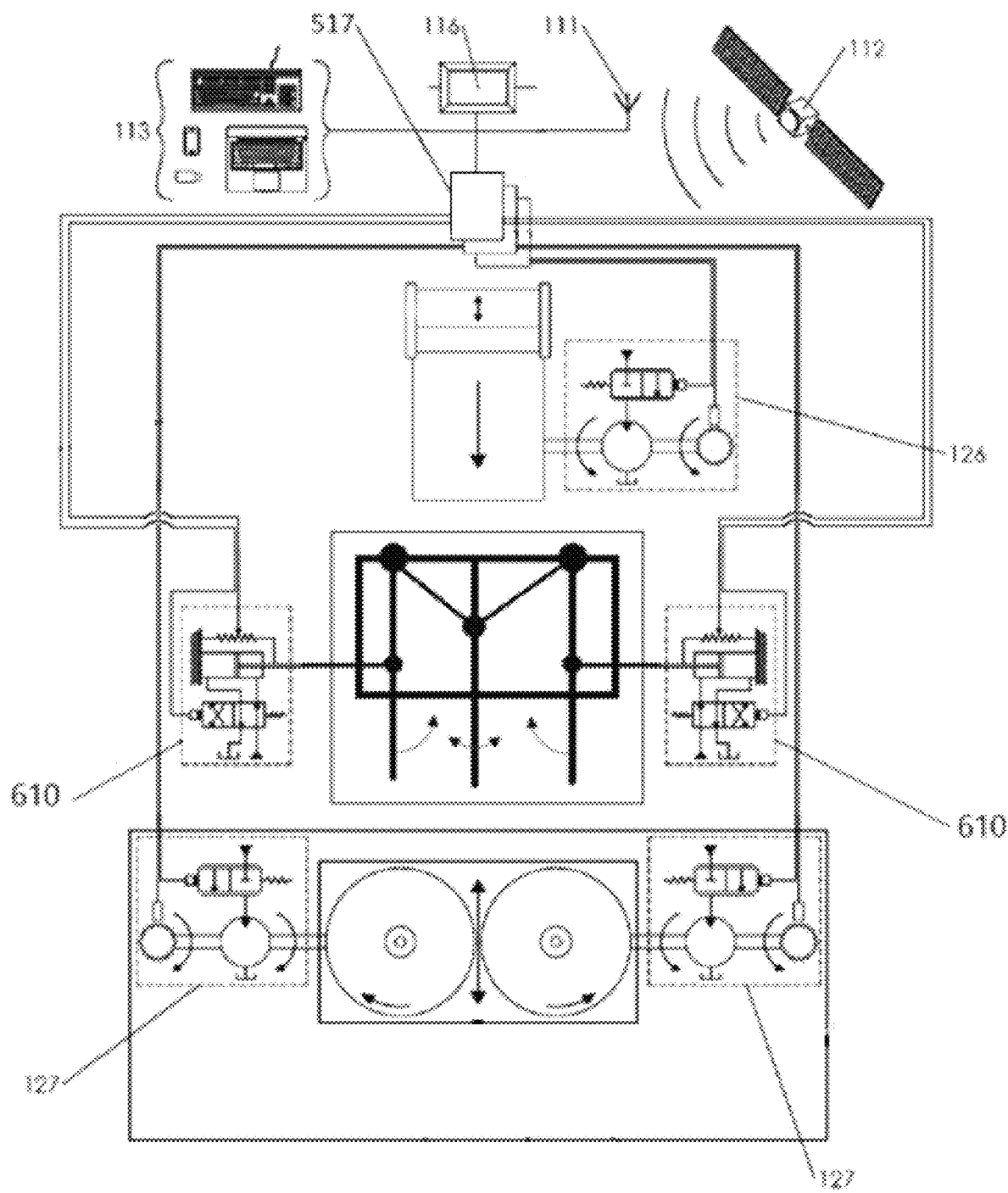
FIG. 24 is a depiction of a system of the present invention in its intended environment.

FIGS. 23 and 24 differ from the configuration according to FIGS. 21 and 22 in that the simplified diagrammatic overviews of control system elements for the present invention includes plurality of boxes 517, spreader device elements 525 and movable material divider 610. The machine controller element 115 processes information and initiates machine actions based on external input elements generally designated 110, empirically derived target elements generally designated 120, and feedback from spreader device elements generally designated 525. In combination with speed and position information, the external input elements 110 are now augmented with additional spreader device elements shown in 525 and include variable symmetrical or asymmetrical swath width definitions, variable rate nutrient prescription files, nutrient material densities, and conveyor metering volumetric constants inputs that are used by the machine controller element 115 to meter the correct volume of material for variable rates and swath widths. The spreader device element 525 include drivers and feedback for conveyor speed 126, independent spinner rpm 127, transversely movable frame position 128, longitudinally moveable frame position 129, movable metering gate 130 and moveable material divider 610 per the needs of the external driver elements 110 and empirically derived target elements 120.

It is understood that all elements of FIG. 23 can be applied to single or multi-compartment spreaders.

In one embodiment of the present invention, linear actuator 428 is a hydraulic actuator and the two dark lines coupled thereto are hydraulic fluid lines. In another embodiment of the invention, the linear actuator 428 is an electric actuator and the two dark lines coupled thereto are electric control lines. In still another embodiment of the present invention, the linear actuator 428 is a pneumatic actuator and the two dark lines coupled thereto are air lines.

Those skilled in the art of designing automated broadcast spreader systems may create a system which is different from those shown here, however it is believed that various modifications and changes to the systems described could be made without deviating from the spirit and scope of the present invention. The appended claims are intended to cover such modifications and changes.

We claim:

1. A centrifugal spreader comprising:
a container with a first end;
a material transporter to transport particulate material from said container to a material divider;
said material divider mounted below said first end, positioned to receive material therein and having a plurality of outlet orifices;
a spinner mounted below said material divider, and positioned to receive material therein;
said spinner having a plurality of centrifugal disks each with a throwing vane thereon; and
each of said plurality of centrifugal disks being positioned below one of said plurality of outlet orifices;
said material divider having a first internal moving part;
wherein said first internal moving part is configured to be moved by a moveable linkage;
said first internal moving part is moveably connected to a first actuator;
wherein said first internal moving part is configured to direct material to:
only a first disk of said plurality of centrifugal disks;
only a second disk of said plurality of centrifugal disks; or
both said first disk and said second disk.

2. The centrifugal spreader of claim 1 wherein said material transporter is not a part of a non-stacked plurality of material transporters.

3. The centrifugal spreader of claim 1 wherein said internal moving part is configured to direct material to a right-hand centrifugal disk.

4. The centrifugal spreader of claim 1 wherein said internal moving part is configured to direct material evenly to both said first disk and said second disk.

5. The centrifugal spreader of claim 1 wherein said internal moving part is coupled with a center material flow diverter rotatable about a hinge axis, a right-hand material flow diverter rotatable about said hinge axis and a left-hand material flow diverter rotatable about said hinge axis are driven by a hydraulic cylinder.

6. A centrifugal spreader comprising:
a container having a first end;
a stream separator mounted below said first end and positioned to receive material therein;
means for conveying material from said container to said stream separator;
said stream separator having a plurality of outlet orifices;
a plurality of centrifugal disks each positioned below one of said plurality of outlet orifices; and each of said plurality of centrifugal disks having a throwing vane thereon; and
a flow adjuster configured for adjusting flow of material through said stream separator in a variable manner to said plurality of outlet orifices, in a manner where one outlet orifice can be deprived of material without changing said means for conveying in any manner.

7. The centrifugal spreader according to claim 6 wherein the flow adjuster is internally movable within said stream separator and is driven by a force transmission device; and said means for conveying material does not include a plurality of non-stacked conveyors.

8. The centrifugal spreader according to claim 7 wherein said force transmission device is a hydraulic cylinder and the flow adjuster includes a first material flow diverter rotatable about a first axis, a second material flow diverter rotatable about a second hinge axis and a third material flow diverter rotatable about a third hinge axis.

9. The centrifugal spreader according to claim 7 wherein said force transmission device is an electric actuator.

10. The centrifugal spreader according to claim 7 wherein said force transmission device is a pneumatic cylinder.

11. The centrifugal spreader according to claim 10 wherein the force transmission device is responsive to processor input and sensor feedback.

12. The centrifugal spreader according to claim 11 wherein a spread pattern is controlled by a control system based on an application rate according to a prescription map, and field boundaries.

13. The centrifugal spreader according to claim 12 wherein the control system adjusts the spread pattern based on contactless detection of particulate material distributed on a disk spreader.

14. The centrifugal spreader according to claim 13 wherein a contactless detection of particulate material distributed is evaluated by the control system in which a distribution parameter of one of: a heading, an airspeed, a deployed material distribution shape and density of deployed material distribution shape can be determined; and the flow adjuster includes a center material flow diverter rotatable about hinge axis, a right-hand material flow diverter rotatable about hinge axis and a left-hand material flow diverter rotatable about hinge axis.

15. The centrifugal spreader according to claim 7 wherein said force transmission device is manually adjustable.

16. A centrifugal spreader comprising:
a container having a first end;
a stream separator disposed below said first end and positioned to receive material therein;
a material transporter between said container and said stream separator;
said stream separator having a plurality of outlets;
a plurality of rotatable members each positioned below one of said plurality of outlets; and each of said plurality of rotatable members having a throwing vane thereon; and
a flow adjuster configured for adjusting a flow characteristic of material through said stream separator in a variable manner to said plurality of outlets, where all adjustments necessary to cause all flow from said stream separator to flow through just one of said plurality of outlets can be accomplished by making adjustments to said stream separator, and specifically excluding any need to make any adjustments to said material transporter.

* * * * *